United States Patent
Shen et al.

(10) Patent No.: US 10,327,034 B2
(45) Date of Patent: Jun. 18, 2019

(54) METHODS, APPARATUS AND SYSTEMS FOR EXCHANGE OF VIDEO CONTENT

(71) Applicant: TVU Networks Corporation, Mountain View, CA (US)

(72) Inventors: Paul Shen, Woodside, CA (US); Matthew Richard McEwen, San Jose, CA (US); Shiwen Yao, Sunnyvale, CA (US)

(73) Assignee: TVU Networks Corporation, Mountain View, CA (US)

( * ) Notice: Subject to any disclaimer, the term of this patent is extended or adjusted under 35 U.S.C. 154(b) by 146 days.

(21) Appl. No.: 15/475,284

(22) Filed: Mar. 31, 2017

(65) Prior Publication Data

US 2017/0303005 A1    Oct. 19, 2017

Related U.S. Application Data

(63) Continuation-in-part of application No. 14/666,467, filed on Mar. 24, 2015, now Pat. No. 9,640,223.
(Continued)

(51) Int. Cl.
     *G11B 27/34*      (2006.01)
     *H04N 21/472*      (2011.01)
(Continued)

(52) U.S. Cl.
     CPC ... *H04N 21/47211* (2013.01); *G06F 16/7867* (2019.01); *G11B 27/322* (2013.01);
(Continued)

(58) Field of Classification Search
None
See application file for complete search history.

(56) References Cited

U.S. PATENT DOCUMENTS 6,504,571 B1    1/2003    Narayanaswami et al.
7,472,175 B2   12/2008    Bartholomew
(Continued)

FOREIGN PATENT DOCUMENTS

CN         101652789        2/2010
EP           0959418       11/1999
(Continued)

OTHER PUBLICATIONS

Jayathilake "A technical insight into community Geographic Information Systems for smartphones" (Year: 2011).*
(Continued)

*Primary Examiner* — Eileen M Adams
(74) *Attorney, Agent, or Firm* — Lipsitz & McAllister, LLC

(57) ABSTRACT

Methods, apparatus, and systems for exchange of video content are provided. A media outlet device is provided with a media outlet application, and a user device of a user is provided with an interactive media application, the interactive media application enabling communications with the media outlet device via the media outlet application. Video content is recorded and encoded on the user device. An interactive map is displayed on a user interface of the media outlet device. The interactive map shows a current location of the user device. The purchase of the video content from the user is enabled via the user interface. The purchased video content is communicated from the user device to at least one of a central server and the media outlet device.

23 Claims, 12 Drawing Sheets

Related U.S. Application Data

(60) Provisional application No. 61/971,224, filed on Mar. 27, 2014.

(51) Int. Cl.

| | | |
|---|---|---|
| *H04N 21/4788* | (2011.01) | |
| *H04N 21/235* | (2011.01) | |
| *H04N 21/84* | (2011.01) | |
| *H04N 21/2743* | (2011.01) | |
| *G11B 27/32* | (2006.01) | |
| *G06F 16/78* | (2019.01) | |

(52) U.S. Cl.
CPC ......... *G11B 27/34* (2013.01); *H04N 21/2353* (2013.01); *H04N 21/2743* (2013.01); *H04N 21/4788* (2013.01); *H04N 21/47205* (2013.01); *H04N 21/84* (2013.01)

(56) References Cited

U.S. PATENT DOCUMENTS

| | | |
|---|---|---|
| 7,797,740 B2 | 9/2010 | Blom et al. |
| 7,840,427 B2 | 11/2010 | O'Sullivan |
| 8,890,866 B2 | 11/2014 | Meadow et al. |
| 8,943,140 B1 | 1/2015 | Kothari |
| 9,258,698 B2 | 2/2016 | Singh et al. |
| 9,282,291 B2 | 3/2016 | Tanji et al. |
| 10,083,608 B2 | 9/2018 | O'Sullivan |
| 2007/0067104 A1 | 3/2007 | Mays |
| 2007/0162971 A1 | 7/2007 | Blom et al. |
| 2008/0195428 A1* | 8/2008 | O'Sullivan ............ G06Q 10/00 705/6 |
| 2008/0266324 A1 | 10/2008 | Lynch et al. |
| 2009/0222432 A1* | 9/2009 | Ratnakar ............ G06F 16/5866 |
| 2010/0122174 A1 | 5/2010 | Snibbe et al. |
| 2010/0287611 A1 | 11/2010 | Blom et al. |
| 2010/0333034 A1 | 12/2010 | Carlson et al. |
| 2010/0333155 A1 | 12/2010 | Royall et al. |
| 2011/0025851 A1 | 2/2011 | Rumble |
| 2011/0029883 A1 | 2/2011 | Lussier et al. |
| 2011/0030031 A1 | 2/2011 | Lussier et al. |
| 2011/0059693 A1 | 3/2011 | O'Sullivan |
| 2011/0102670 A1 | 5/2011 | Tanji et al. |
| 2011/0157037 A1 | 6/2011 | Shamir et al. |
| 2011/0275364 A1* | 11/2011 | Austin .................... H04L 41/06 455/423 |
| 2011/0276423 A1 | 11/2011 | Davidson |
| 2011/0306326 A1 | 12/2011 | Reed et al. |
| 2011/0311199 A1 | 12/2011 | Fay et al. |
| 2012/0060177 A1 | 3/2012 | Stinson, III et al. |
| 2012/0062590 A1 | 3/2012 | Morohoshi et al. |
| 2012/0102124 A1 | 4/2012 | Hansson et al. |
| 2012/0192239 A1 | 7/2012 | Harwell et al. |
| 2012/0282914 A1 | 11/2012 | Alexander |
| 2013/0073623 A1 | 3/2013 | Nguyen et al. |
| 2013/0268962 A1 | 10/2013 | Snider et al. |
| 2013/0302005 A1 | 11/2013 | Harwell et al. |
| 2013/0329086 A1 | 12/2013 | Malone |
| 2014/0006129 A1* | 1/2014 | Heath ................ G06Q 30/0222 705/14.23 |
| 2014/0012895 A1 | 1/2014 | Lieberman et al. |
| 2014/0067955 A1 | 3/2014 | Christian |
| 2014/0213304 A1 | 7/2014 | Beckett et al. |
| 2014/0258158 A1 | 9/2014 | Levy |
| 2015/0128061 A1* | 5/2015 | Lesner .................... G06F 3/017 715/740 |
| 2015/0139615 A1 | 5/2015 | Hill |
| 2015/0172394 A1* | 6/2015 | Lapenna ................ H04L 67/18 715/751 |
| 2015/0204688 A1* | 7/2015 | Gearhart ............ G01C 21/3679 701/540 |
| 2015/0231505 A1 | 8/2015 | Imai et al. |

FOREIGN PATENT DOCUMENTS

| | | |
|---|---|---|
| JP | 2001290731 | 10/2001 |
| JP | 2009522679 | 6/2009 |
| JP | 2010182028 | 8/2010 |
| WO | 2010004693 | 1/2010 |
| WO | 2014035729 | 3/2014 |

OTHER PUBLICATIONS

Unknown, How to Use Moto G Camera and Change Camera Settings?, Jan. 7, 2014, [retrieved on Sep. 28, 2017], 7 pages, <URL: https://web.archive.org/web/20140107071551/http://allaboutmotog.com:80/moto-g-how-to-guide/how-to-use-moto-g-camera/>.

Unknown, Foto-Upload-Automatik abschalten, Oct. 5, 2013, [retrieved on Oct. 20, 2017], 2 pages, <URL: https://web.archive.org/web/20140310214310/https://www.heise.de/ct/hotline/Foto-Upload-Automatik-abschalten-2056868.html>.

Steve's Digicams, "Camcorders vs. Cameras: for Video and Stills", Mar. 17, 2014, [retrieved on Jun. 5, 2017], 2 pages, <URL: https://web.archive.org/web/20140317224453/http://www.steves-digicams.com/knowledge-center/how-tos/digital-camera-operation/camcorders-vs-cameras-fo . . . >.

* cited by examiner

METHODS, APPARATUS AND SYSTEMS FOR EXCHANGE OF VIDEO CONTENT

This application is a continuation-in-part of U.S. patent application Ser. No. 14/666,467, filed on Mar. 24, 2015, which claims the benefit of U.S. Provisional Application No. 61/971,224 filed on Mar. 27, 2014, each of which is incorporated herein and made a part hereof by reference for all purposes.

BACKGROUND OF THE INVENTION

The present invention relates generally to the field of video recording/transmission and social media. More specifically, the present invention relates to methods, apparatus, and systems for obtaining, verifying, and directing recorded or live video content.

Every day, television stations and professionals involved in video production shoot countless hours of video content using camcorders or other types of external recorders in the field. Some of this content may be streamed live to a television station (or other news venue, website, or the like) using various methods such as cellular based uplink devices, satellites, microwave transmission, or other means. However, the majority of the content will remain on the original camcorder media or recording device until it is physically brought back to the studio (or other production facility) or transferred asynchronously via IP to the studio, which can be a very time consuming process.

Once the original content arrives back in the studio, it rarely provides the end-user (editor or production staff) with details of the recording other than the time of recording (e.g., via a time-stamp) and the user typically must preview the content in order to locate the desired content.

In addition, social media has become an important part of television production and news distribution. In particular, social media has had a large impact on live television production that includes news, sports, weather, live events, entertainment, and more. With audiences having many more choices regarding when and where they choose to get their information, traditional television broadcasters must expand their reach in order to remain competitive for audience attention.

Social media has enabled production staff in the studio (such as anchors, news directors, assignment desk managers, producers, social media desk managers, etc.) or staff in the field (such as production crews, reporters/on-air talent, camerapersons, technical crews, field producers, etc.) to quickly communicate with audiences using popular social media applications such as Twitter, Facebook, Google+ and others. By communicating directly with an audience during a live television production, it is possible to drive viewers immediately to a particular program to watch an event such as a breaking news story.

Also, social media itself has become a valid outlet that competes with traditional providers of news, sports, weather and other time sensitive media. For example, breaking news or live sporting events may be recorded and displayed by individuals on their social media applications in real-time or near real-time. Due to the prevalence of social media applications on smartphones and other electronic devices, it is more likely that a private individual is present at the start of a breaking news story than a traditional news reporter, or that the private individual obtains a certain view or video snippet of a live event that is not obtained by traditional media coverage.

It would be advantageous to enable the ability to search for content based on geographic location and/or time. It would be further advantageous to leverage the use of GPS systems in connection with the storage of metadata information which includes time and geographic information for the video content.

It would also be advantageous if traditional media outlets, such as a news, sports, or weather television channels could leverage social media accounts of individuals to enable the capturing and presentation of live events from social media for presentation via the traditional outlets, enabling almost anyone to contribute content for broadcasting. It would be further advantageous if personnel at the traditional media outlets were enabled to interact with individuals during the process of capturing such live events in order to direct the individual during the recording or presentation of the live events to guide and provide instructions to the individual via a chat function. It would be advantageous if such interaction were enabled via an application that would connect individuals and traditional media outlets and provide compensation to the individuals for their contributions to the traditional media outlets.

The methods, apparatus and systems of the present invention provide the foregoing and other advantages.

SUMMARY OF THE INVENTION

The present invention relates to methods, apparatus, and systems for time-based and geographic navigation of recorded or live video content.

An example embodiment of a system for time-based and geographic navigation of video content in accordance with the present invention comprises an Internet enabled video capture and encoding module for recording and encoding video content and associated metadata information for storage and transmission. The associated metadata information may comprise at least one of date and time information of the recording and geographic position information indicative of a recording location of the video capture and encoding module during the recording. The system also comprises a remote storage and web server device for receiving the recorded video content and the associated metadata information from the video capture and encoding module. The system further comprises a graphical user interface associated with the remote storage and web server device. The graphical user interface comprises an interactive map showing a route and a current location of the video capture and encoding module and enabling a search of the recorded video content by the at least one of the date and time information and the geographic position information. Selected recorded video content can be one of streamed or downloaded to a select location for display or storage.

The system may also comprise a local storage module associated with the video capture and encoding module for locally storing the recorded video content and associated metadata information. The local storage module may be integrated into the video capture and encoding module or connected to the video capture and encoding module via a wired or wireless connection. The local storage module may store a high-resolution version of the video content and/or a low resolution version of the video content. A low-resolution version of the video content may be provided to the remote storage and web server device.

Alternatively, at least one of a high-resolution version or a low-resolution version of the video content may be provided (either directly from the video capture and encoding module or via the local storage module) to the remote storage and web server device.

Upon selection of the recorded video content, a high-resolution version of the selected recorded video content is streamed or downloaded to the select location. The high-resolution version of the selected recorded video content may be streamed or downloaded from one of a local storage module associated with the video capture and encoding module or the remote storage and web server device.

The select location may comprise one of a video server, a client viewing device, a broadcast television channel, a streaming channel, a newsfeed, a website, a social media platform, a playout server, an archive server, a news automation system, a non-linear editing system, a content delivery network (CDN), an online video portal (OVP), and the like.

The system may comprise multiple video capture and encoding modules. In such an example embodiment, a corresponding plurality of routes and current locations for each of the plurality of the video capture and encoding modules are displayed on the interactive map.

For each of the recording locations along the route, a waypoint indicator may be displayed on the route on the interactive map. Selecting one of the waypoint indicators may enable viewing of one of a low-resolution photograph or a low resolution video clip from the recorded content at the corresponding recording location.

The waypoint indicators may comprise one of a low-resolution photograph or a low resolution video clip from the recorded content at the corresponding recording location.

A number of waypoint indicators displayed along each route may be configurable. In addition, a number of waypoint indicators displayed along each route may be automatically adjusted when zooming or expanding a map view of the map.

The graphical user interface may further comprise a table showing date, time and GPS coordinates for each way point. Selecting an entry from the table may enable viewing of one of a low-resolution photograph or a low resolution video clip from the recorded content at the corresponding recording location.

The system may further comprise a GPS module associated with the video capture and encoding module for providing the geographic position information.

The metadata information may further comprise at least one of camera location, length of video, video and audio format, timecode, size of video file, camera identification information, ownership and copyright information, and additional metadata information predefined or dynamically logged by a user, or any other type of identifying information. The additional metadata information may comprise at least one of assignment name, geographic location, camera man name, reporter name, camera crew name, assistant name, producer name, story title, subject matter reference, program name, user comments, and the like. The video content may be searchable by any of the metadata information or a combination of any of the metadata information.

The video content may be further searchable using at least one of a range of dates, a range of times, a timecode, and a current time.

The interactive map may display current position, speed, and direction information of the video capture and encoding module.

The video capture and encoding module may comprise one of a video camera, a camcorder, a television camera, a movie camera, a portable electronic device, a tablet computer, a smart phone, an IP or web camera, or the like.

The system may further comprise a remote access device for remotely accessing the remote storage and web server device. In such an example embodiment, the graphical user interface may be displayed on the remote access device. The remote access device may comprise one of a computer, a laptop computer, a portable electronic device, a tablet computer, a smart phone, and the like.

The remote storage and web server device may comprise one of a computer running a local software application or a cloud-based application.

The selected recorded video content may comprise one of a selected portion of the recorded content at high-resolution or low resolution, the entirety of the recorded content at high-resolution or low resolution, and a selected image or images from the recorded content at high-resolution or low-resolution.

The metadata may be one of: recorded and stored simultaneously with the recorded video content at the remote storage and web server device in real-time or near real-time; or subsequently transferred with the recorded video content to the remote storage and web server device from local storage associated with the video capture and encoding module.

Alternatively, the metadata may be one of: recorded and stored without the recorded video content at the remote storage and web server device in real-time or near real-time; or subsequently transferred to the remote storage and web server device from local storage associated with the video capture and encoding module separately from the recorded video content.

The graphical user interface may further comprise at least one of: a zoom feature for zooming in on the route or a portion of the route; an expand feature for expanding an area of the map; a location change feature for changing a display location of the map; a selection interface for selecting at least one of a time and date range of the route being displayed, and the like.

The present invention also includes apparatus and methods corresponding to the system embodiments described above.

An example embodiment of a method for time-based and geographic navigation of video content in accordance with the present invention comprises recording and encoding video content and associated metadata information for storage and transmission using a video capture and encoding module. The associated metadata information may comprise at least one of date and time information of the recording and geographic position information indicative of a recording location of the video capture and encoding module during the recording. The method further comprises communicating the recorded video content and the associated metadata information from the video capture and encoding module to a remote storage and web server device, and enabling, via a graphical user interface associated with the remote storage and web server device, display of an interactive map showing a route and current location of the video capture and encoding module. The method also comprises searching the recorded video content using at least one of the graphical user interface and the interactive map by the at least one of the date and time information and the geographic position information, and selecting recorded video content for one of streaming or downloading to a select location for display or storage.

In a further example embodiment of the present invention, a method for exchange of video content is provided. The method comprises providing a media outlet application on a media outlet device and providing an interactive media application on a user device of a user, the interactive media application enabling communications with the media outlet device via the media outlet application. Video content is recorded and encoded on the user device. An interactive map is displayed on a user interface of the media outlet device. The interactive map shows a current location of the user device. Purchase of the video content from the user is enabled via the user interface. The purchased video content can then be communicated from the user device to at least one of a central server and the media outlet device.

Associated metadata information may be also be recorded for storage and transmission together with the video content. The associated metadata information may comprise at least one of date and time information of the recording and geographic position information indicative of a recording location of the user device during the recording.

The video content may be either live or recorded content. The video content may be searched via the user interface and the interactive map by the at least one of the date and time information and the geographic position information.

The metadata information may further comprise at least one of user device location, length of video, video and audio format, timecode, size of video file, user device identification information, ownership and copyright information, and additional metadata information predefined or dynamically logged by the user. The additional metadata information may comprise at least one of assignment name, geographic location, user name, story title, subject matter reference, program name, source information (dedicated television recording device/transmitter/receiver, user phone tablet computer, laptop, etc.), type of recording equipment, and user comments.

The video content may be searchable by any of the metadata information or a combination of any of the metadata information. The video content may be further searchable using at least one of a range of dates, a range of times, a timecode, and a current time.

Multiple user devices may be shown on the interactive map with at least one of corresponding recording locations and routes of travel. The multiple user devices may comprise at least one of: active user devices which are currently recording video content; and inactive user devices which are not currently recording video content.

Icons may be provided showing the current location of the user devices. The icons for the active user devices may be of a first color and the icons for the inactive user devices may be of a second color.

One or more groupings of at least one of active and inactive user devices may be denoted by corresponding one or more circles on the map. A size of the one or more circles may correspond to a number of recording sources or users at that location.

A chat function may be enabled on the user device and the media outlet device for communication between the user and a staff member of a media outlet. The chat function may enable at least one of: negotiations for purchase of the video content; directions and instructions from the staff member to the user regarding the current recording of the live video content; and negotiations for purchase of future recording services.

The directions and instructions may relate to at least one of a change in the image currently being recorded, a change in vantage point of the recording, a change in viewing angle, a change in focus point, a change in lighting, a change in zoom amount, or the like.

Text from the chat function may be shown as a transparent or translucent overlay on the user device appearing over a display showing the content being recorded. Further, the chat function may enable a transparent or translucent keyboard overlay on the user device which appears over a display showing the content being recorded.

The interactive map may display the current location, speed, and direction information of the user device.

The user device may comprise one of an electronic device, a tablet computer, a smart phone, a smart watch, an IP or web camera, a dedicated television camera or transceiver (such as those manufactured by TVE Networks Corporation, the owner of the present invention), or the like.

In one example embodiment, a plurality of user devices are provided with the interactive media application, and a corresponding plurality of current locations for each of the plurality of the user devices are displayed on the interactive map.

A corresponding route for each of the plurality of user devices may be displayed on the interactive map. For each recording location along each of the routes, a waypoint indicator may be displayed on the route on the interactive map. Selecting one of the waypoint indicators may enable viewing of one of a low-resolution photograph or a low-resolution video clip from the recorded content at the corresponding recording location.

The method may further comprise at least one of broadcasting the purchased video content, posting the purchased video content on one or more social media outlets, and storing the purchased video content, and the like.

The present invention also includes a corresponding system for exchange of video content. The system may comprise a media outlet device, a user device of a user adapted for recording and encoding video content and for communication with the media outlet device. An interactive map may be displayed on a user interface of the media outlet device, which shows at least a current location of the user device. The system may also comprise a transaction engine enabling purchase of the video content from the user via the user interface. The purchased video content may then be communicated from the user device to at least one of a central server and the media outlet device.

The systems of the present invention may also include various features of the method embodiments discussed above.

BRIEF DESCRIPTION OF THE DRAWINGS

The present invention will hereinafter be described in conjunction with the appended drawing figures, wherein like reference numerals denote like elements, and.

DETAILED DESCRIPTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

The present invention relates to methods, apparatus, and systems for time-based and geographic navigation of recorded or live video. The present invention further relates to methods and apparatus for obtaining, verifying, and directing the recording of live content which leverages social media applications and outlets. The terms "live content", "content" or "video content" as used herein encompass not only video content but also accompanying audio content as well if available for recordation. In addition, it should also be appreciated that the content may comprise still photographs instead of or in addition to video content.

The methods, apparatus, and systems of the present invention enable operators at a remote location to search for video clips, or one or more live streaming clips on the recording device (which may be in a different location), based on either geographic location and date/time of the occurrence, including clips of live events being recorded in real time.

Figure 1:
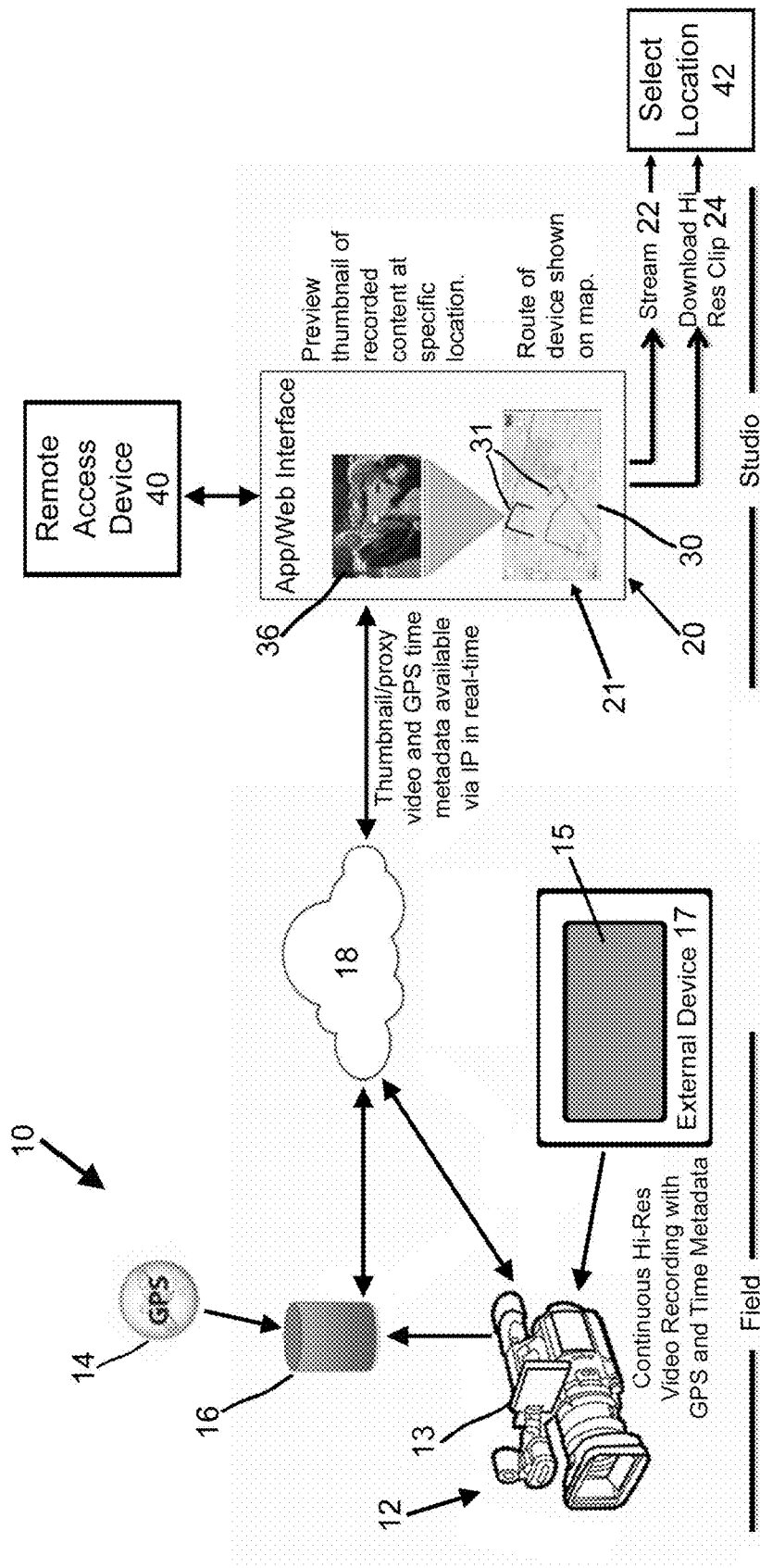
FIG. 1 shows an example embodiment of a system in accordance with the present invention.

An example embodiment of a system for time-based and geographic navigation of video content in accordance with the present invention is shown in FIG. 1. An Internet enabled video capture and encoding module 12 is provided for recording and encoding video content and associated metadata information for storage and transmission. The associated metadata information includes at least one of date and time information of the recording and geographic position information indicative of a recording location of the video capture and encoding module 12 during the recording. The system also comprises a remote storage and web server device 20 for receiving the recorded video content and the associated metadata information from the video capture and encoding module 12 via a network 18 (e.g., such as the Internet). The system further comprises a graphical user interface 21 associated with the remote storage and web server device 20. The graphical user interface 21 comprises an interactive map 30 showing a route 31 and a current location of the video capture and encoding module 12 and enables a search of the recorded video content by the at least one of the date and time information and the geographic position information. Selected recorded video content can be one of streamed 22 or downloaded 24 to a select location 42 for display or storage.

The video capture and encoding module 12 may contain the necessary processor, memory and other hardware to record and process the video content for transmission, and to connect to the network 18.

The network 18 may represent any type of network or combination of networks, such as the Internet, a satellite network, a cellular network, a WAN or a LAN, or any other type of over-the-air uplink system.

The system may also comprise a local storage module 16 associated with the video capture and encoding module 12 for locally storing the recorded video content and/or associated metadata information. The local storage module 16 may be integrated into the video capture and encoding module 12 (e.g., as integrated or removable memory) or separate therefrom but connected to the video capture and encoding module 12 via a wired or wireless connection. If the local storage module 16 is separate from the video capture and encoding module 12, the video capture and encoding module 12 may also comprise internal memory, as is well-known in the art. The local storage module 16 may store a high-resolution version of the video content and/or a low resolution version of the video content. A low-resolution version of the video content may be provided to the remote storage and web server device 20.

Alternatively, at least one of a high-resolution version or a low-resolution version of the video content may be provided (either directly from the video capture and encoding module 12 or via the local storage module 16) to the remote storage and web server device 20.

Upon selection of the recorded video content, a high-resolution version of the selected recorded video content is streamed 22 or downloaded 24 to the select location 42. The high-resolution version of the selected recorded video content may be streamed or downloaded from one of a local storage module 16 associated with the video capture and encoding module 12 or the remote storage and web server device 20. The selected recorded video content may also be streamed or downloaded directly from the video capture and encoding module 12 to the select location 42.

The select location 42 may comprise one of a video server, a client viewing device, a broadcast television channel, a streaming channel, a newsfeed, a website, a social media platform, a playout server, an archive server, a news automation system, a non-linear editing system, a content delivery network (CDN), an online video portal (OVP), and the like. The select location 42 may be entered via the graphical user interface 21.

The system may comprise multiple video capture and encoding modules 12. In such an example embodiment, a corresponding plurality of routes 31 and current locations for each of the plurality of the video capture and encoding modules 12 may be displayed on the interactive map 30.

Figure 2:
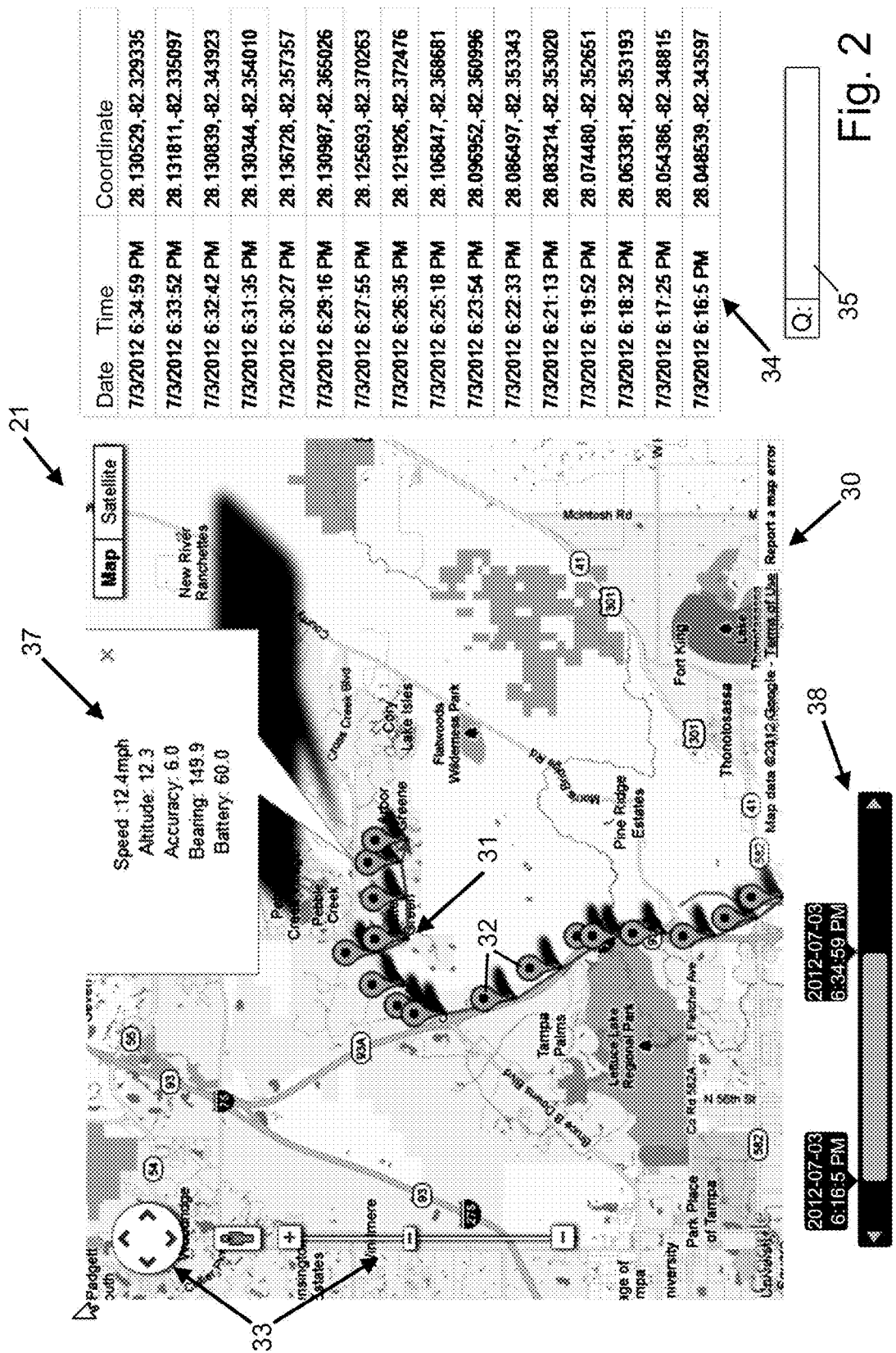
FIG. 2 shows an example embodiment of a graphical user interface in accordance with the present invention.

FIG. 2 shows an example embodiment of a graphical user interface 21 in accordance with the present invention. Two separate routes 31 are shown on the interactive map 30 of FIG. 1 (also referred to herein as a "heat map"), while for clarity, only a single route 31 is shown on the interactive map 30 of FIG. 2. Multiple routes 31 for multiple video capture and encoding modules 12 may be shown. The number of routes 31 and/or the particular video capture and encoding modules 12 for which information is displayed on the map 30 may be configurable (e.g., if ten video capture and encoding modules 12 are active in the field, information for only three of those modules 12 which are close to a particular news event may be shown on the map 30).

As shown in FIG. 2, for each of the recording locations along the route 31, a waypoint indicator 32 may be displayed on the route 31 on the interactive map 30. Selecting one of the waypoint indicators 32 may enable viewing of one of a low-resolution photograph or a low resolution video clip 36 from the recorded content at the corresponding recording location.

The waypoint indicators 32 may comprise either a waypoint icon, a low-resolution photograph 36, or a low resolution video clip 36 from the recorded content at the corresponding recording location. FIG. 2 shows the use of a waypoint icon as a waypoint indicator 32 which, when selected (e.g., via a mouse click or mouse hover) gives various information 37 regarding the video capture and encoding module 12 which may be shown once the waypoint indicator 32 is selected, including but not limited to position, direction, altitude, speed and bearing information of the video capture and encoding module 12. Selection of a waypoint icon may also result in the display of a low resolution version of an image or video clip 36 from the recording location, as shown in FIG. 1. Alternatively, the image or video clip 36 can take the place of the waypoint icon as a waypoint indicator 32.

A number of the waypoint indicators 32 displayed along each route 31 may be configurable. For example, a number of waypoint indicators 32 shown along the route 31 may be configured by an amount of time or distance between each waypoint 32 (e.g., a waypoint every half mile or a waypoint every 5 minutes). In addition, a number of waypoint indicators 32 displayed along each route 31 may be automatically adjusted when zooming or expanding a map view of the map 30. For example, when expanding the map view, more of the route 31 and thus more waypoint indicators 32 along the route 31 may be shown automatically (e.g., while maintaining density and spacing of the waypoint indicators 32). Alternatively, when expanding the map view, the number of waypoint indicators 32 along a portion of the 31 route shown may be reduced or increased as desired. When zooming in to a particular portion of the map 30 or portion of a route 31, more waypoint indicators 32 may be shown.

The graphical user interface 21 may further comprise a table 34 showing date, time and GPS coordinates for each way point indicator 32. Instead of GPS coordinates, a street address may be shown. Selecting an entry from the table 34 may enable viewing of one of a low-resolution photograph or a low resolution video clip 36 (as shown in FIG. 1) from the recorded content at the corresponding recording location.

The system may further comprise a GPS module 14 associated with the video capture and encoding module 12 for providing the geographic position information. The GPS module 14 may be integrated into the video capture and encoding module 12 and/or the local storage module 16, or implemented separately therefrom. Depending on whether or not the local storage module 16 is integrated into the video capture/encoding module 12, the local storage module 16 and/or the video capture/encoding module 12 may be in communication with GPS 14.

The metadata information may further comprise at least one of camera location, length of video, video and audio format, timecode, size of video file, camera identification information, ownership and copyright information, and additional metadata information predefined or dynamically logged by a user, or any other type of identifying information. The additional metadata information may include at least one of assignment name, geographic location, camera man name, reporter name, camera crew name, assistant name, producer name, story title, subject matter reference, program name, user comments, and the like.

The metadata information is used by the remote storage and web server device 20 to enable the display of the map 30 and corresponding search features of the graphical user interface 21. The video content may be searchable by any of the metadata information or a combination of any of the metadata information. For example, searching via the metadata may be enabled via a search box 35 on the graphical user interface 21. Further, a user can also narrow the search by using additional metadata, such as camera crew name, story title, and the like.

The additional metadata information may be entered by the user via a keypad on the video capture and encoding module 12, via a touch screen keypad on a video screen 13 of the video capture and encoding module 12, or via an external device 17 in communication with the video capture and encoding module 12 (e.g., via a touch screen 15 or keypad on the external device 17). In addition, the additional metadata may also be entered via the graphical user interface 21 subsequent to recording of the video content.

The video capture and encoding module 12 may comprise one of a video camera, a camcorder, a television camera, a movie camera, a portable electronic device, a tablet computer, a smart phone, an IP or web camera, or the like.

A user may access the remote storage and web service device 20 directly or through a remote access device 40 for remotely accessing the remote storage and web server device 20 via the network 18. In such an example embodiment, the graphical user interface 21 may be displayed on the remote access device 40 and the remote access device may enable all the features of the remote storage and web server device discussed herein. The remote access device 40 may comprise one of a computer, a laptop computer, a portable electronic device, a tablet computer, a smart phone, or any other type of Internet enabled device.

The external storage device 16 may be integrated into the external device 17. In addition or alternatively, the external device 17 may include the same functionality as the remote access device 40. The external device 17 may be in wired or local wireless communication with the video capture and encoding module 12, or connected thereto via the network 18. The external device 17 may comprise one of a computer, a laptop computer, a portable electronic device, a tablet computer, a smart phone, or any other type of Internet enabled device.

The remote storage and web server device 20 may comprise one of a computer running a local software application or a cloud-based application, each of which provides a web interface.

The selected recorded video content may comprise one of a selected portion of the recorded content at high-resolution or low resolution, the entirety of the recorded content at high-resolution or low resolution, and a selected image or images from the recorded content at high-resolution or low-resolution.

The metadata may be one of: recorded and stored simultaneously with the recorded video content at the remote storage and web server device 20 in real-time or near real-time; or subsequently transferred with the recorded video content to the remote storage and web server device 20 from the local storage module 16 associated with the video capture and encoding module 12.

Alternatively, the metadata may be one of: recorded and stored without the recorded video content at the remote storage and web server device 20 in real-time or near real-time; or subsequently transferred to the remote storage and web server device 20 from the local storage module 16 associated with the video capture and encoding module 12 separately from the recorded video content.

The graphical user interface 21 allows an operator to search by geographic region (e.g., using the map and route tracking functions). The graphical user interface 21 may further comprise at least one of: a zoom feature for zooming in on the route or a portion of the route; an expand feature for expanding an area of the map; a location change feature for changing a display location of the map; a selection interface for selecting at least one of a time and date range of the route being displayed, and the like. Standard map navigation controls 33 for zoom, expand and location change may be used. The graphical user interface 21 also enables searching of the video content by date and time, by a range of dates and/or times (up to and including the current time/real-time searching), a timecode, and a current time, for example through the use of a slidable date/time interface 38.

In one example embodiment of the present invention, the video capture and encoding module 12, the GPS module 14, and the local storage module 16 may make up a subsystem 10. The remote storage and web service device 20 may receive and store the metadata information from one or multiple subsystems 10. Remote storage and web service device 20 may also store the associated video content from multiple subsystems 10. The graphical user interface 21 running on the remote storage and web service device 20 enables searching of the video content by at least date, time and/or location (based on the metadata information associated with the video content), and the ability to download and/or pass the video content or selected portions thereof (e.g., content stream 22 or high resolution video clip 24) on for further use or display.

Subsystem 10 may be located in the field (e.g., remote from a production facility). The remote storage and web service device 20 may be located at, for example, a production facility machine room. The remote access device 40 may be located at, for example, a news room. However, due to the potential portability of the subsystem 10, they can each be located at any location either remote from each other or in the same vicinity.

During use, the subsystem 10 records video content to the local storage module 16 (or internal memory of video capture/encoding module 12) and associated metadata, including but not limited to data from GPS 14. Part or all of the metadata is simultaneously recorded or transferred at a later stage onto the remote storage and web service 20 with or without the corresponding video content. The metadata is used by the remote storage and web service 20 to enable the display of the map 30 and corresponding search features. Once the desired content has been located based on geographic area, time, or other metadata, it is possible to either stream the content via IP from the field directly to a desired select location 42 (as shown at 22 in FIG. 1) or download the content (or a portion of it) in high resolution format (as shown at 24 in FIG. 1) at a select location 42.

The present invention may also be adapted to enable individuals (referred to herein as "citizen reporters") to capture and then provide content to traditional media outlets via social media applications enabled on user devices. Individuals with smartphones and other electronic devices are prevalent in today's society and most such devices are equipped with various social media applications as well as cameras and video recorders. With the present invention, the content captured by the user and uploaded onto such social media applications can be shared with traditional media outlets, turning every individual with a smartphone or similar electronic device into a "citizen reporter" capable of providing content to traditional media outlets such as news, sports, and weather channels, and the like.

Figure 3:
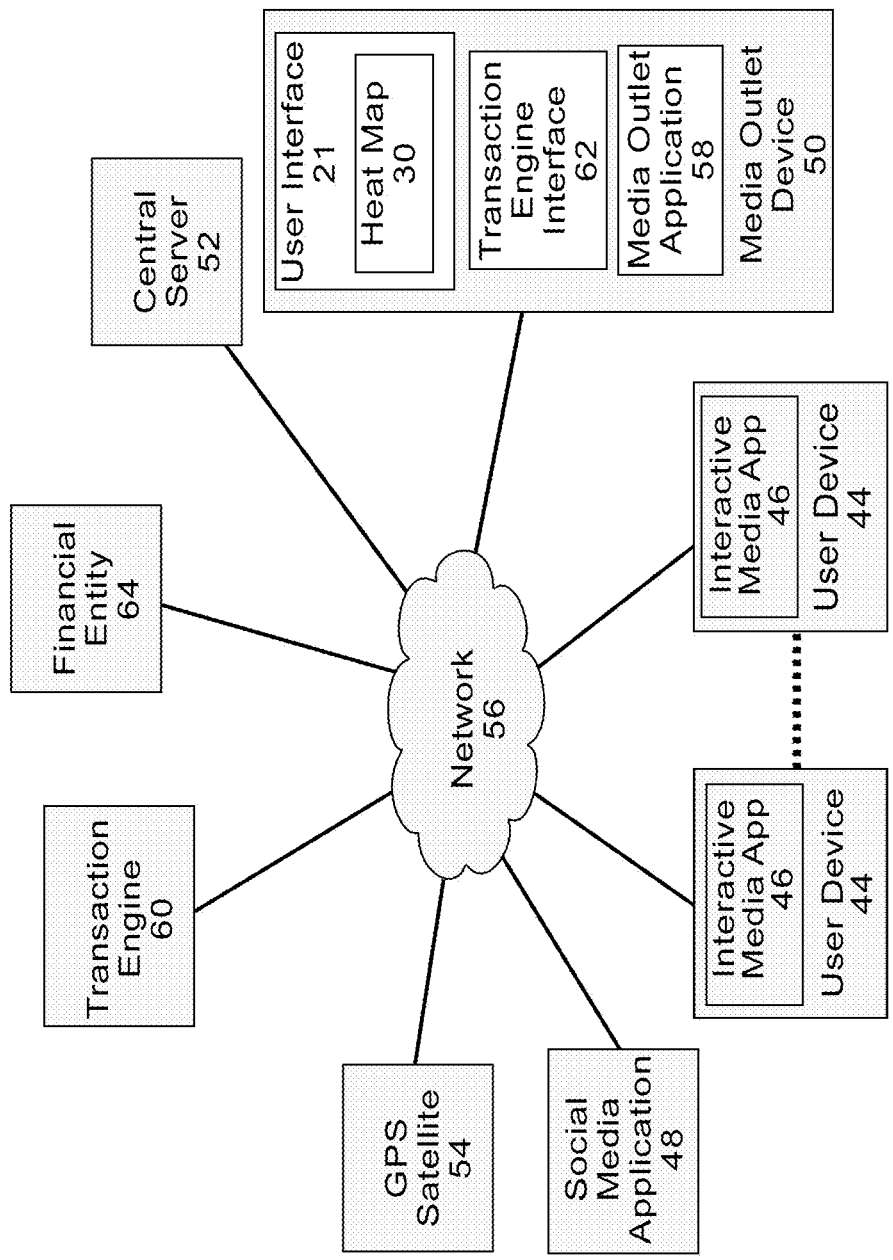
FIG. 3 shows a block diagram of a system in accordance with a further example embodiment of the present invention.

FIG. 3 shows an example embodiment of a system for implementing an embodiment of the invention enabling media outlets to search and enter into purchase agreements with citizen reporters for content currently being recorded or to be recorded in the future. A citizen reporter may upload live or recorded video content to a social media application 48 via a user device 44 as a way of advertising their services to a media outlet for purchase. In addition, a software application (referred to herein as an "interactive media application" 46) may be loaded onto the individual's user device 44 that enables the user device 44 to be connected to the media outlet (e.g., to media outlet device 50). The user device 44 may comprise any type of personal computing device, such as a smart phone, a tablet computer, a laptop, a portable computer, a smart watch, or other internet or network enabled device with video recording capabilities.

The interactive media application 46 may enable communication between the individual citizen reporter and staff at the media outlet by connecting the user device 44 with the media outlet device 50 via a network 56. In addition, the interactive media application 46 enables location tracking of the user device 44 by sending time, date and location information to a central server 52. For example, the application may leverage a GPS application already resident on the user device 44, or may include a GPS module in communication with a GPS satellite 54.

The interactive media application 46 may also enable the media outlet staff to view content currently being recorded or stored on the individual's device (either directly on the media outlet device or via a social media application 48, which may take the form of a website or mobile application, or the like), and direct the individual in the photographing or recording of additional content, as discussed in detail below. The interactive media application 46 enables the staff at the media outlet to be in constant connection and continuous communication with the citizen reporter (or other contributor as discussed above), which enables not only control over the content being recorded but also verification of the content being recorded and the location of the recording.

Thus, a network of private users (citizen reporters) running the interactive media application 46 may be created and connected to the media outlet via the media outlet device 50. A media outlet application 58 running on the media outlet device 50 (which may comprise, for example a desktop computer, a laptop, a tablet computer, a smartphone, a dedicated television camera or transceiver as discussed above, or other internet enabled device) enables staff at the media outlet to view the location of the various citizen reporters connected to the media outlet (e.g., via a network 56 such as, for example, a global area network, a cellular network, the Internet, or the like). For example, the location of the citizen reporters may be displayed on an interactive map 30 as part of a graphical user interface 21, as discussed above and shown in FIG. 1. Metadata with date, time, location and other information as discussed above in connection with FIGS. 1 and 2 may be recorded and provided with the video content for use in tracking the location of the citizen reporters during the recording of the content.

The present invention may also be expanded to permit one media outlet to search for live or recorded content of another media outlet, and/or for one media outlet to contribute content to another media outlet.

The interactive media application 46 and/or the media outlet application 58 may be either a downloadable application or a web-based application running on any type of computerized device having the necessary hardware and software, including computer processors, communication interfaces, and the like.

In an example embodiment, the user interface 21 and heat map 30 may be accessed from or implemented on the media outlet device 50. The user interface may be enabled via the media outlet application 58. Alternatively, the media outlet device and/or the media outlet application 58 may comprise the remote storage and web server device 20 discussed above in connection with FIG. 1, and corresponding features and functionality may be provided. As discussed above, the Heat Map 30 enables the media staff to select content from a reporter (in this embodiment, one or more citizen reporters) and display it on screen, enabling the media staff to remotely view raw news, sports, concert footage, weather, traffic, accident or other live footage. Access to the user interface 21 and map 30 may be by authorization only (e.g., user name and password or other security measures).

As discussed above in connection with FIG. 1, the Heat Map 30 enables the media staff to determine the current locations of user devices running the interactive media application 46. By monitoring these users (either via the interactive media application itself or via monitoring of the user's social media accounts), the media staff can easily determine when and where news is breaking and to select footage that is desirable for live broadcast, posting to social media, or rebroadcast. If particular footage is selected, the media staff can communicate with the citizen reporter and enter into a purchase agreement with the citizen reporter for the rights to rebroadcast or otherwise display the media content. Such a transaction is enabled via a transaction engine 60 coupled to the media outlet device 50 via a transaction engine interface 62, as shown in FIG. 3. To facilitate such transactions, the user's bank account information or other forms of electronic payment (such as account information for PayPal, Google Wallet, and the like) may be entered into the interactive media application 46 via the user device 44 and communicated to the transaction engine 60 and/or the media outlet device 50. The transaction engine 60 may be in communication with a financial entity 64 for processing of the transaction. The financial entity 64 may comprise a bank, a credit card company, PayPal, Google Wallet servers, or other entities that process electronic payments. The transaction engine 60 may also be adapted to generate an invoice for the transaction.

Various purchase options for content may be presented. For example, the user may be paid more for exclusive live footage, less for content that is also being recorded by other users (shared content), and less still for recorded content of an event. The pricing may be preset pricing, negotiated pricing, or arrived at via an auction.

Purchased content may be provided directly from the user device 44 to the media outlet device 50 for display and rebroadcasting (e.g., via conventional broadcast outlets like television news channels, a media outlet website or streaming channel, or the media outlets' social media channels or accounts). Alternatively or in addition, the purchased content may be uploaded to the central server 52 prior to or simultaneously with the provision of the content to the media outlet device 50.

Prior to purchase, staff at the media outlet may be provided with a low resolution video clip 36 of a portion of the content, similar to that discussed above in connection with FIG. 1. The low resolution video clip 36 may be viewed by a click on or a mouse hover over the user icon (waypoint indicator) 32 as discussed above.

Figure 4:
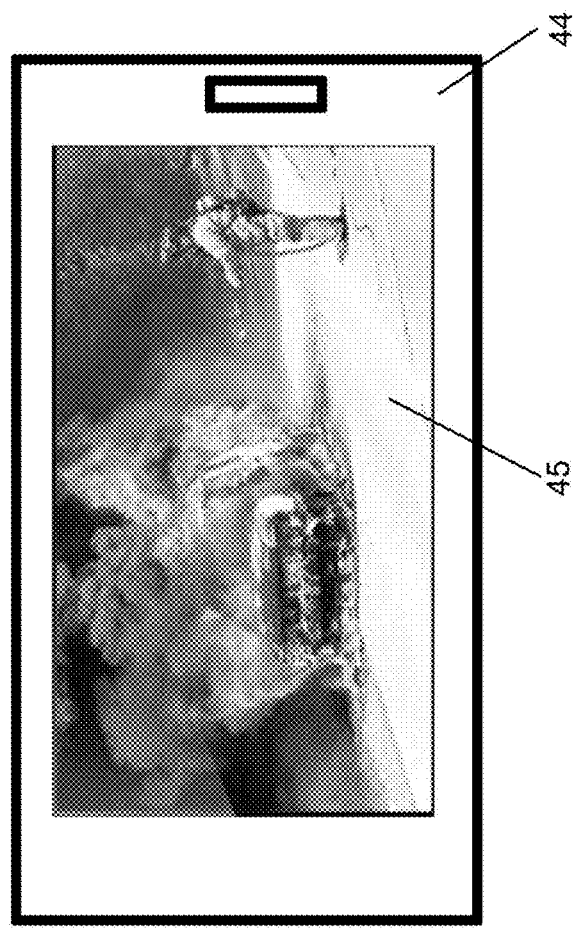
FIG. 4 shows an example embodiment of a user device during recording of video content.
Figure 5:
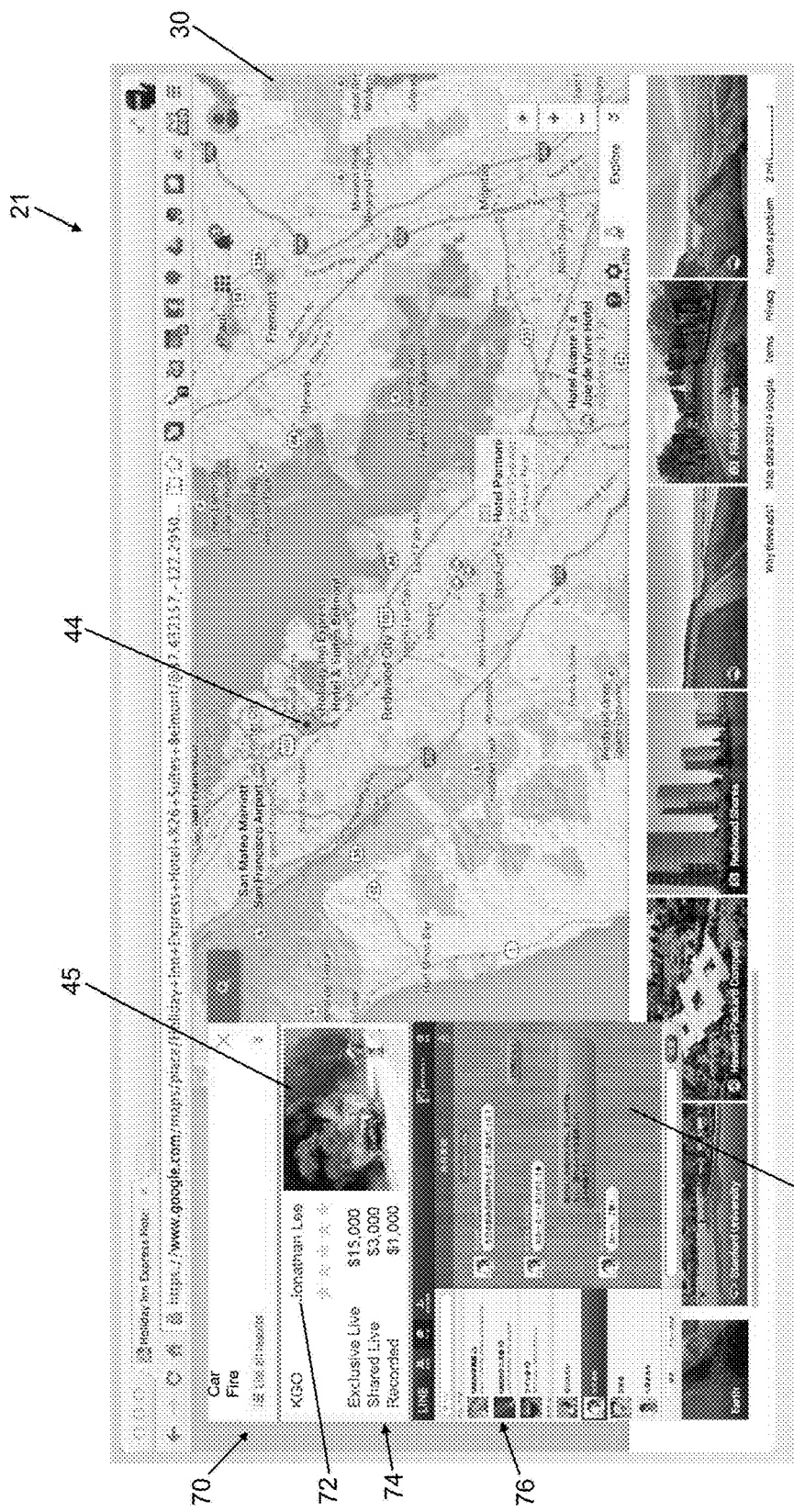
FIG. 5 shows an example embodiment of a user interface with an interactive map.

FIG. 4 shows an example of a user device 44 recording live video footage 45 of a car fire. FIG. 5 shows an example of the user interface 21 of the media outlet device 50 showing the interactive map 30 when the user device 44 of FIG. 4 is selected. For clarity, the map 30 shows the location of only the selected user device 44. The user interface also shows the current video footage 45 being recorded in a sidebar 70, together with the user name 72, and purchase amounts 74 (and optionally descriptions) for various types of video footage (e.g., exclusive live recordings, shared live recordings (also being recorded by others), and recorded/stored footage).

The sidebar 70 of FIG. 5 also shows an example of a listing 76 of available citizen reporters and a chat function 78 for communication with one or more citizen reporter(s) selected from the list 76.

Figure 6:
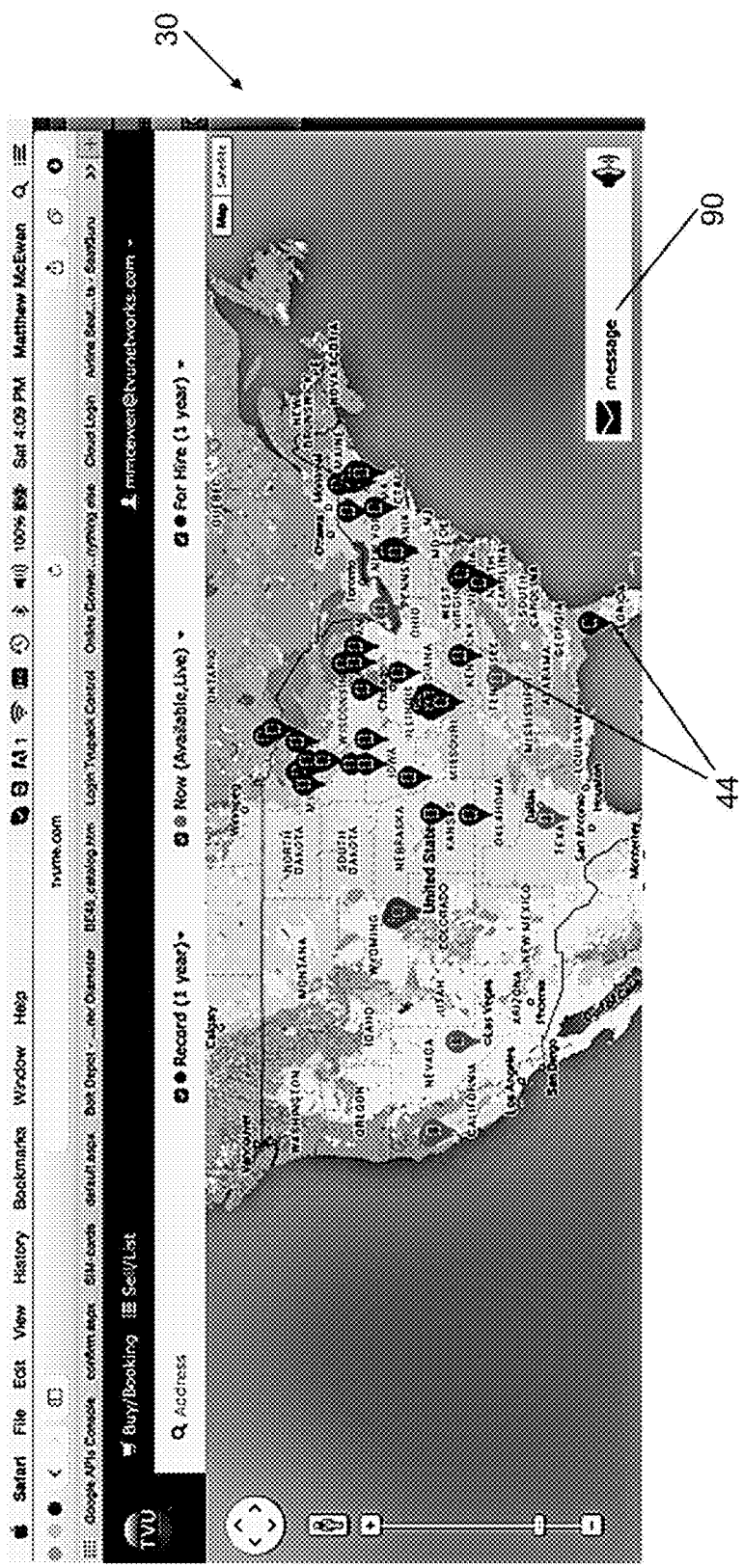
FIG. 6 shows an example embodiment of an interactive map.

FIG. 6 shows an example embodiment of the Heat Map 30 showing the current location of all user devices running the interactive media application in a particular area (in this case, the United States). It should be appreciated that the map 30 may be configured so that different areas or regions are shown, including smaller or larger areas than that illustrated in FIG. 6. For example, the map 30 may be configured to show a single country, a single state, multiple states or countries, individual towns or cities, multiple towns or cities, specific geographic regions, or the like. User devices 44 which are actively transmitting content to the media outlet (e.g., those that are in live mode) may be shown in one color (e.g., red) and user devices 44 not recording content (e.g., those that are in standby mode) may be shown in another color (e.g., blue).

Figure 7:
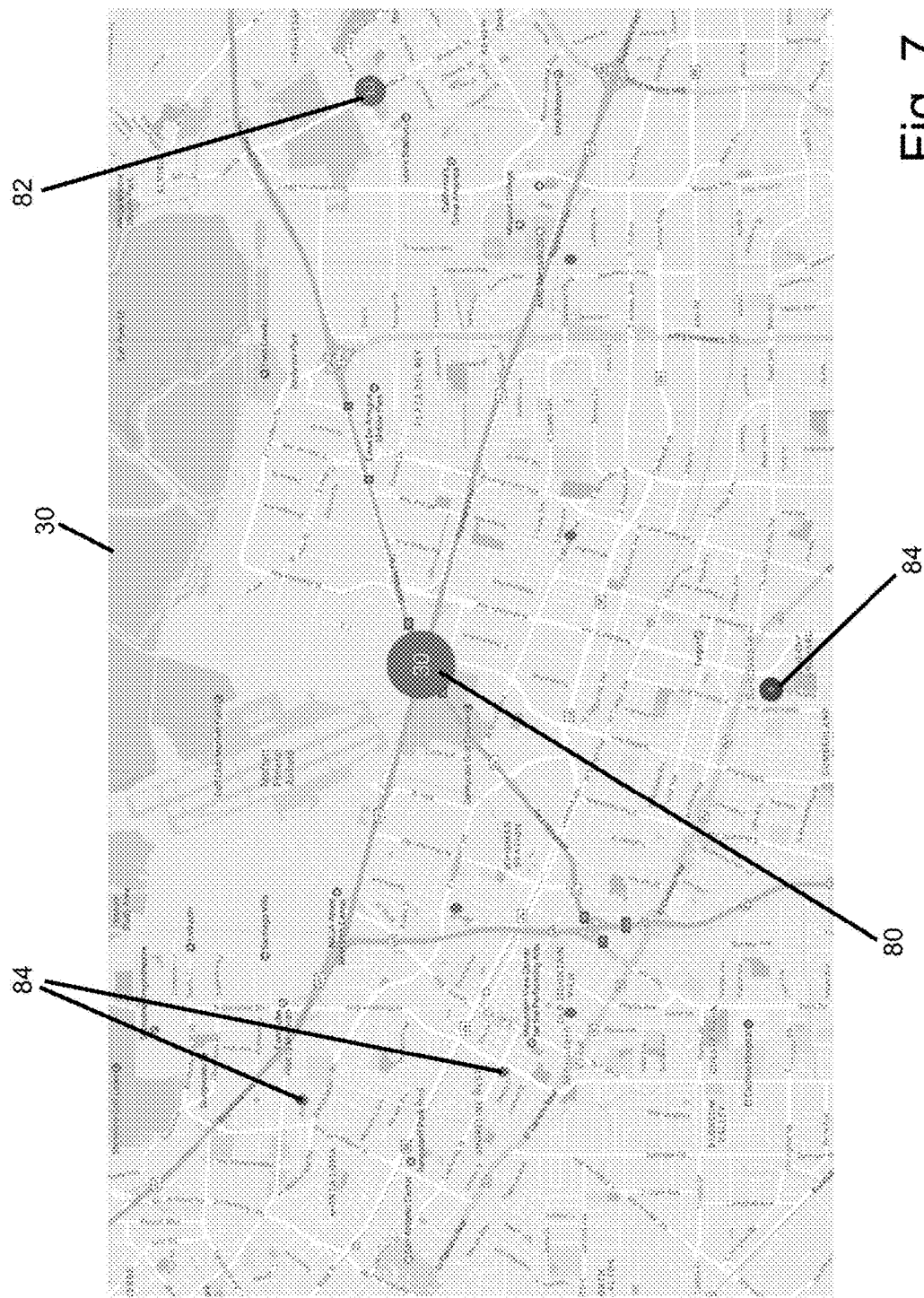
FIG. 7 shows a further example embodiment of an interactive map.
Figure 8:
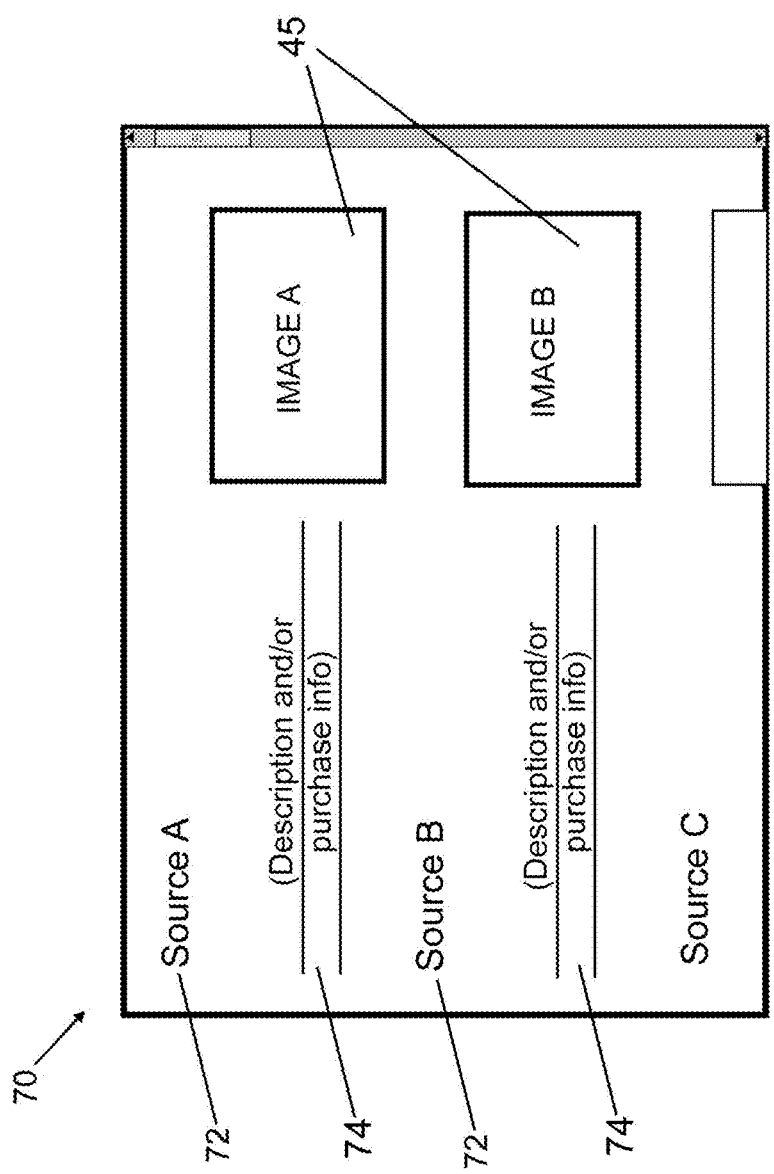
FIG. 8 shows an example embodiment of a sidebar of a user interface resulting from a selection of a grouping of user devices from the interactive map of FIG. 7.

The user devices 44 may be grouped together on the map 30. For example, user devices 44 which are in close proximity to each other may be shown as a large circle. Progressively sized (smaller or larger) circles can be used to show correspondingly sized groups of user devices. A number may be provided inside the circle denoting the number of user devices in the area. As shown in FIG. 7, a large circle 80 with the number 30 in the center is shown, designating thirty user devices 44 in the area corresponding to the position of the circle on the map 30, a smaller circle 82 with the number 10 in the center indicates ten user devices 44 in the area corresponding to the position of the circle 82 on the map 30, and smaller circles 84 represent lower numbers of user devices 44 in the corresponding areas of the map 30. The user devices 44 in live mode may be shown in a circle of a first color (e.g., a red circle) and those in standby mode may be shown in circle of a second color (e.g., a blue circle). By clicking on a circle (e.g., circle 80, 82, 84), a listing of all corresponding user devices 44 (whether live, standby, or both) will be shown in the user interface 21. For example, upon clicking on one of the circles shown in FIG. 7, a listing of the citizen reporters/sources corresponding to the user devices 44 within the circle may be presented in the sidebar 70 of the user interface 21, as shown in FIG. 8. The listing may be scrollable and include the name or the source 72 of the recordings, a low resolution image or video clip 45 from the recordings, and a description and/or purchase information 74 relating to the recordings. The media staff at the media outlet can then select to receive content from a user or multiple users, and enter into corresponding transactions for the purchase of the content. It should be appreciated that any or all the features of the map 30 and user interface 21 discussed above with FIGS. 1 and 2 may also be implemented in connection with the embodiments shown in FIGS. 5, 6, and 7.

Figure 9:
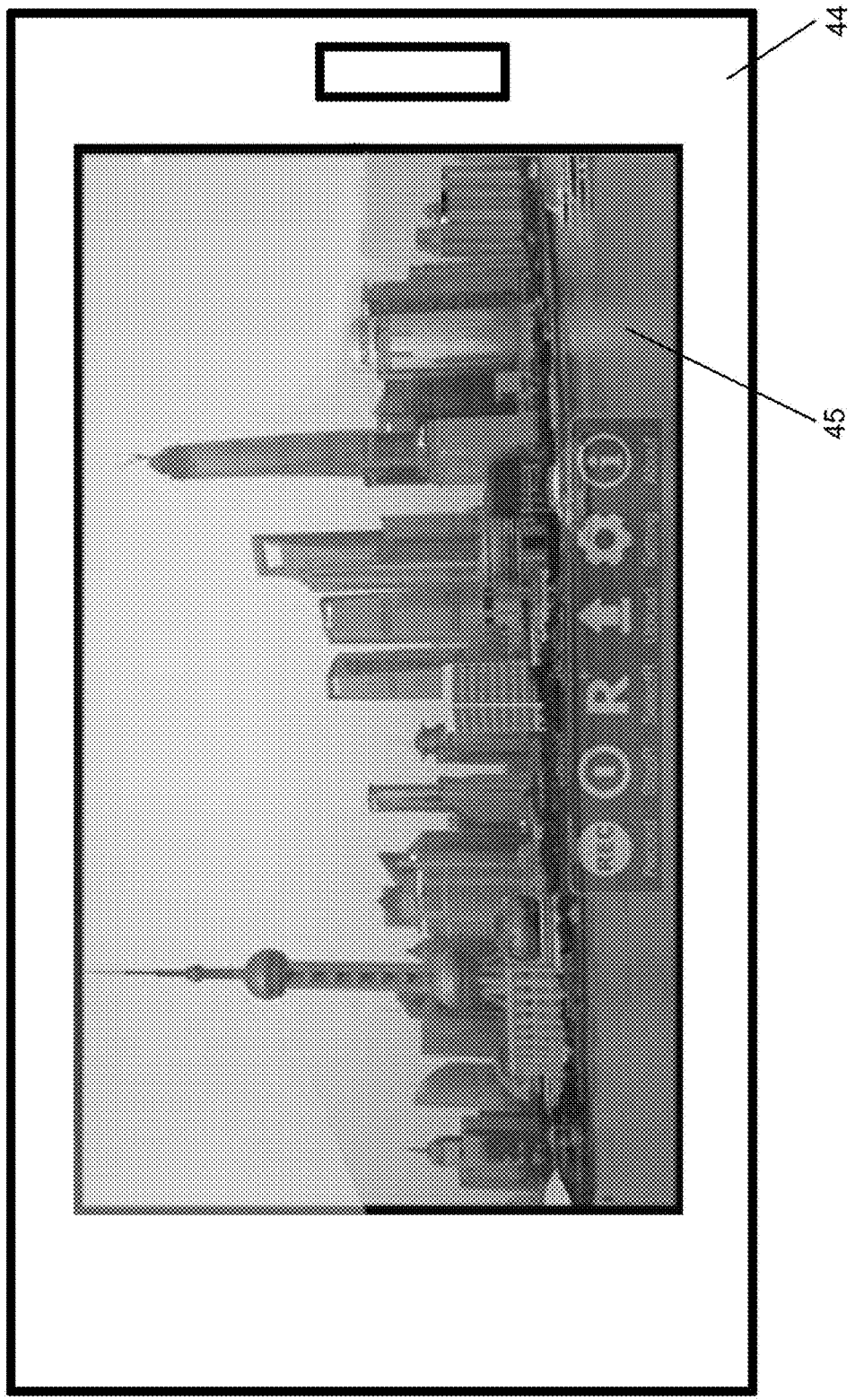
FIG. 9 shows a further example embodiment of a user device during recording of video content.
Figure 10:
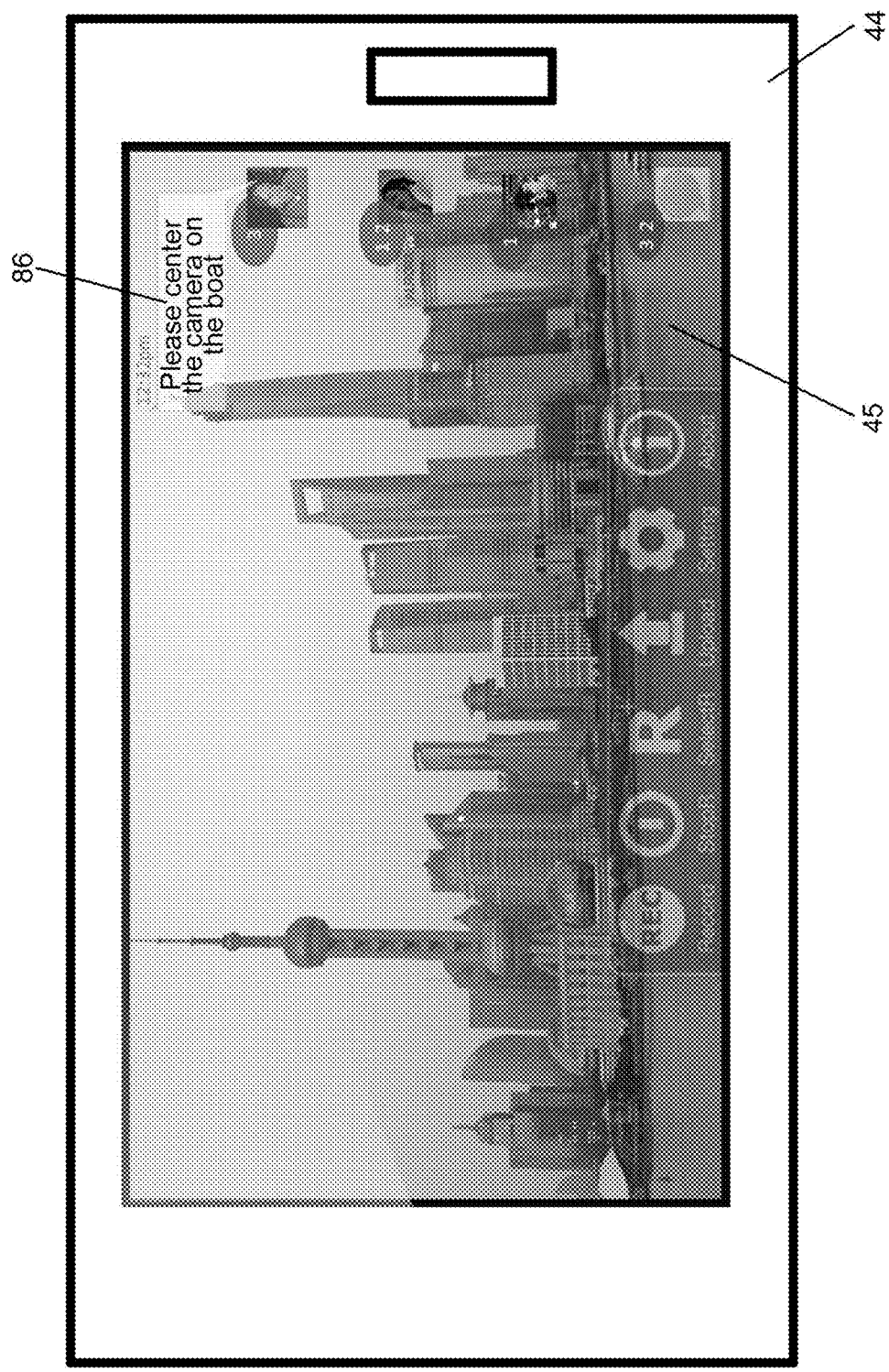
FIGS. 10 and 11 show the user device of FIG. 9 illustrating an example embodiment of a chat function.
Figure 11:
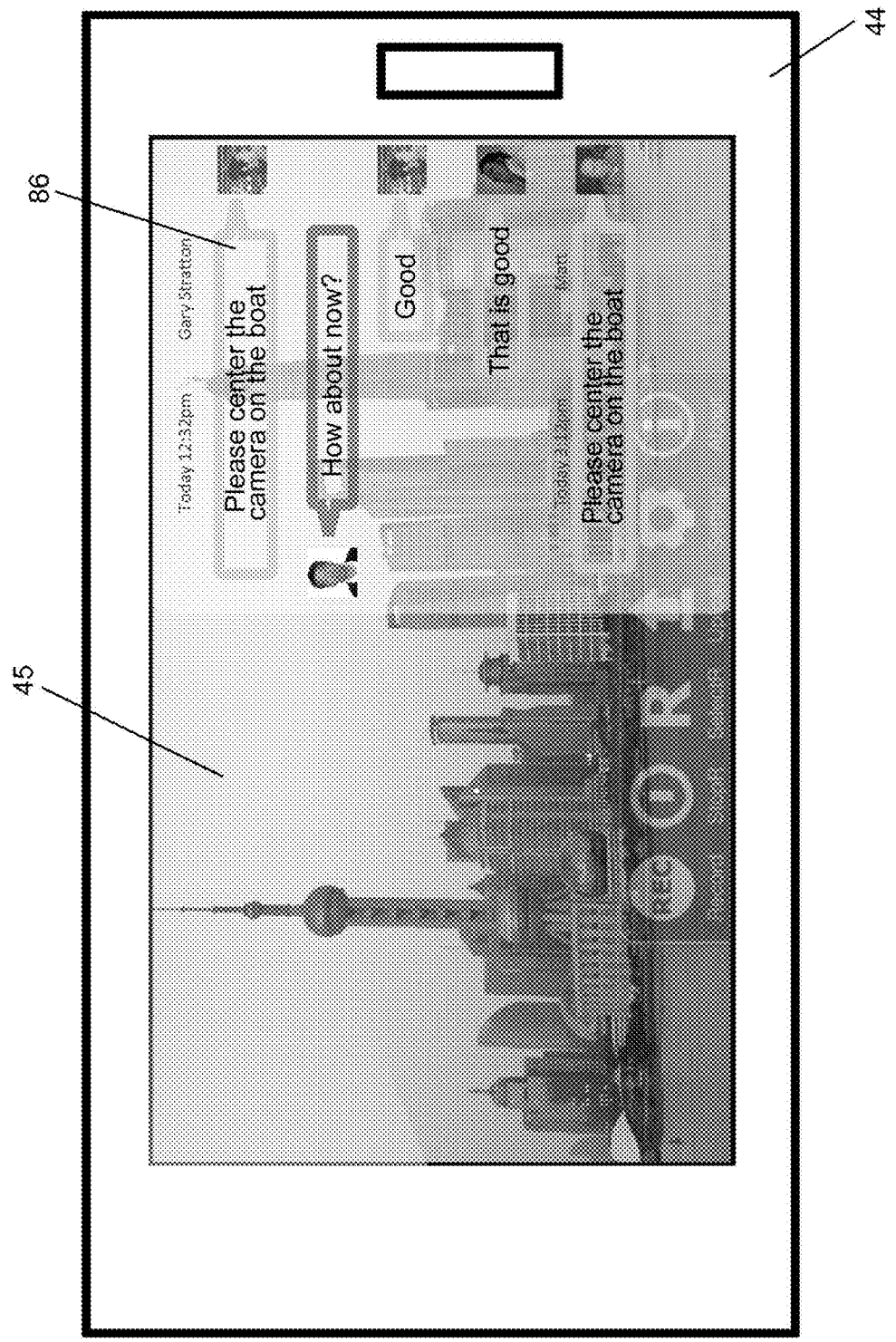
Figure 12:
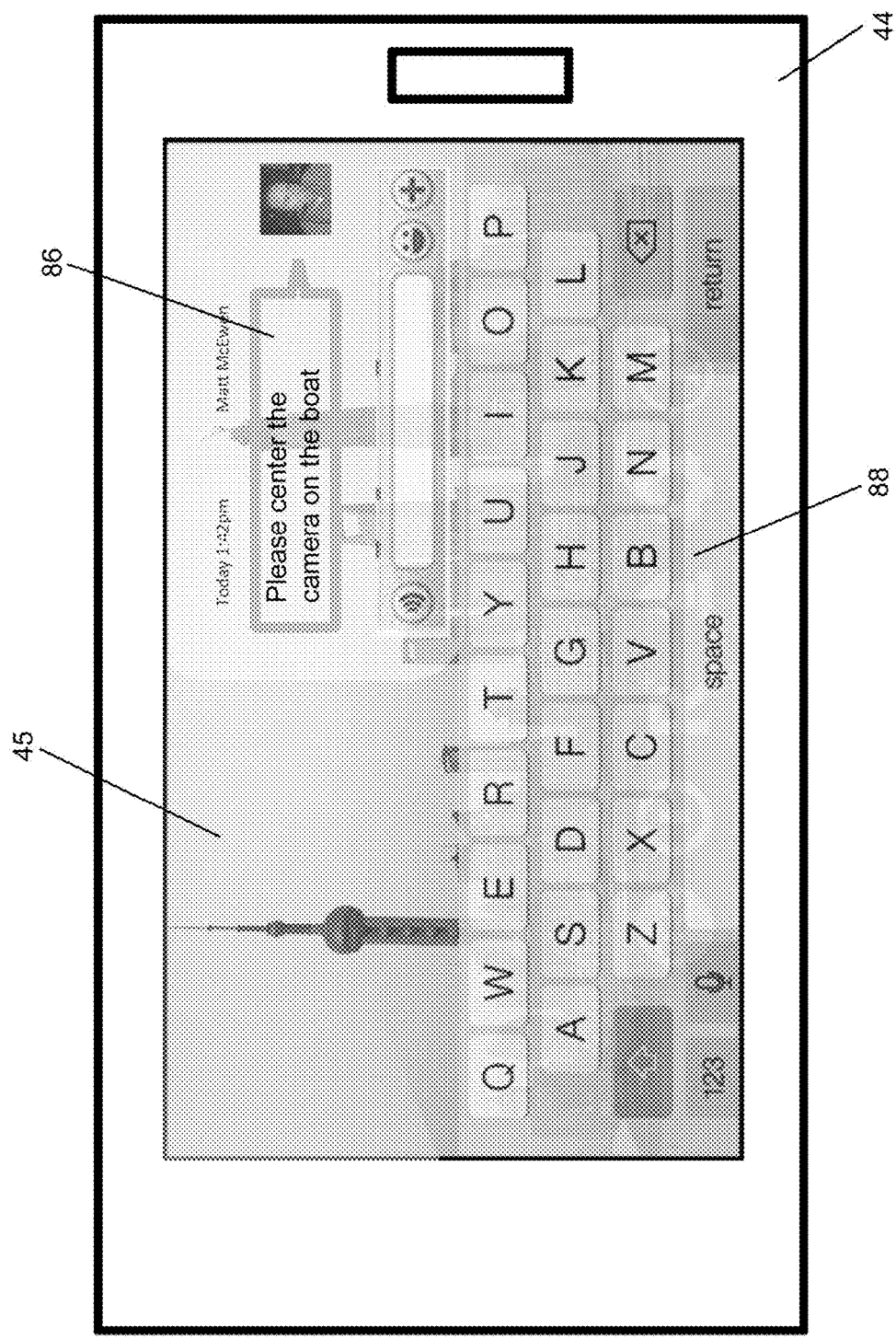
FIG. 12 shows the user device of FIGS. 9-11 with an example embodiment having a keyboard overlay.

As discussed above, a chat feature will enable the media staff to communicate with the selected citizen reporter. For example, the chat feature may be enabled via either the interactive media application 46 or a social media application 48. Clicking on or entering the citizen reporter's user identification (which may be for example, a user name, a user number, or the like) using a chat feature 78 on the user interface 21, or clicking on a corresponding icon for the citizen reporter displayed on the map 30, may initiate communication with the citizen reporter. Using the chat feature, the media staff may then be able to direct the citizen reporter to obtain different images or videos of the live event, change viewing angle or vantage point, image focus point, zoom/expand, and the like. For example, the media staff can enter commands or directions into the user interface which will appear as a transparent or translucent text overlay on a display of the citizen reporter's device. The text overlay may appear right over the content being recorded, which remains viewable or partially viewable through the text. For example, in FIG. 9 shows video footage 45 of a boat on a river currently being recorded and displayed on the user device 44. In FIG. 10, the chat function has been initiated and the media staff has entered "Please center the camera on the boat" after viewing the video footage 45, and this command has shown up as a text box/overlay 86 on the citizen reporter's device screen. As shown in FIG. 11, a series of commands and replies can be overlayed on the device screen (or other user interface) regarding the image or video at issue. FIG. 12 shows an example of a keyboard overlay 88 that may be provided as part of the application that may appear on the screen to enable the citizen reporter's communications with the media staff. The keyboard overlay 88 may be a transparent or translucent overlay appearing on the display over the content being recorded, which remains viewable or partly viewable beneath the overlay. Messages from the citizen reporter to the media staff may be displayed on a screen of the media outlet device, for example in chat function 78 in sidebar 70 (as shown in FIG. 5) provided on the Heat Map or as an overlay on the video content being transmitted from the citizen reporter.

The messages (whether on the user device or the media outlet device) may appear only briefly and then be hidden, or may remain until a response is received and/or the chat session is terminated. If a message is hidden, it may be represented on the media outlet device by an indication (such as a message number, alert, or other labeling) on an icon representing the user device 44 on the map 30, or by a message icon 90 shown on the map 30 or user interface 21. Clicking on the icon will show all messages from that user. The chat session or user messages may also be shown in a sidebar 70 of the user interface 21.

Group chats may be enabled. For example, the media staff may click on multiple user icons to chat with multiple citizen reporters reporting the same event, or by entering the user identification information of multiple citizen reporters after clicking on a group chat icon provided on a menu bar of the Heat Map 30 or user interface 21. Where citizen reporters are grouped as discussed above in connection with FIG. 7, clicking on a group or circle of citizen reporters may automatically enable group chat with all citizen reporters of that group.

In addition, using the chat function, broadcasters may send global or group communications to all connected citizen reporters requesting recording services for future events (e.g., for recording upcoming live events such as sporting events, news conferences, live performances, pending storm or other known weather events, and other scheduled events or occurrences).

In one example embodiment, the content may be uploaded to a video marketplace where recorded content and/or live content is available for sale. Users, such as broadcasters, can search for, download, and rebroadcast previously recorded video content for a fee. Broadcasters or other users can also search for and purchase live content pertaining to breaking news and live events using the heat map 30, and also identify and schedule individuals to record upcoming/future live events, including but not limited to sporting events, concerts or other entertainment events, other publicly scheduled events, or the like. The video marketplace may comprise not only the heat map 30 but also include a listing of citizen reporters together with their locations and/or areas of operation. Selecting a citizen reporter from the list will provide a listing of pre-recorded content recorded by that reporter. The content may be listed by various identifiers, including but not limited to by name (e.g., name of event or the like), type of content (news, sports, accident, concert footage, weather, storm, etc.), location, or other key words. The content of each citizen reporter, or the content of all citizen reporters, may be searchable by such key words or identifiers (as discussed above in connection with FIG. 2).

It should now be appreciated that the present invention provides advantageous methods and apparatus for searching video content based on date, time, geographic location, or other metadata. The present invention advantageously enables video content recorded in a remote location to be accessed, searched, and reviewed by a user in another location just seconds after the content was recorded.

In addition, the present invention advantageously enables traditional media outlets to obtain live or recorded video coverage from citizen reporters, and to avoid problems associated with locating live coverage, verifying that photographs or videos are unaltered, and interviewing personnel on site during a live event.

Although the invention has been described in connection with various illustrated embodiments, numerous modifications and adaptations may be made thereto without departing from the spirit and scope of the invention as set forth in the claims.

What is claimed is:

1. A method for exchange of video content, comprising:
providing a media outlet application on a media outlet device;
providing an interactive media application on a user device of a user, the interactive media application enabling communications with the media outlet device via the media outlet application;
recording and encoding video content on the user device;
recording associated metadata information for storage and transmission together with the video content, the associated metadata information comprising at least one of date and time information of the recording and geographic position information indicative of a recording location of the user device during the recording;
displaying an interactive map on a user interface of the media outlet device, the interactive map showing a current location of the user device;
searching the recorded video content via the user interface and the interactive map by the at least one of the date and time information and the geographic position information;

enabling purchase of the video content from the user via the user interface; and communicating the purchased video content from the user device to at least one of a central server and the media outlet device.

2. A method in accordance with claim 1, wherein:
the metadata information further comprises at least one of user device location, length of video, video and audio format, timecode, size of video file, user device identification information, ownership and copyright information, and additional metadata information predefined or dynamically logged by the user.

3. A method in accordance with claim 2, wherein:
the additional metadata information comprises at least one of assignment name, geographic location, user name, story title, subject matter reference, program name, source information, type of recording equipment, and user comments;
the video content is searchable by any of the metadata information or a combination of any of the metadata information.

4. A method in accordance with claim 1, wherein the video content is further searchable using at least one of a range of dates, a range of times, a timecode, and a current time.

5. A method in accordance with claim 1, wherein multiple user devices are shown on the interactive map with at least one of corresponding recording locations and routes of travel.

6. A method in accordance with claim 1, further comprising:
enabling a chat function on the user device and the media outlet device for communication between the user and a staff member of a media outlet.

7. A method in accordance with claim 1, wherein the interactive map displays the current location, speed, and direction information of the user device.

8. A method in accordance with claim 1, wherein the user device comprises one of an electronic device, a tablet computer, a smart phone, a smart watch, a dedicated television camera, and an IP or web camera.

9. A method in accordance with claim 1, wherein:
a plurality of user devices are provided with the interactive media application; and
a corresponding plurality of current locations for each of the plurality of the user devices are displayed on the interactive map.

10. A method in accordance with claim 1, further comprising at least one of broadcasting the purchased video content, posting the purchased video content on one or more social media outlets, and storing the purchased video content.

11. A method for exchange of video content, comprising:
providing a media outlet application on a media outlet device;
providing an interactive media application on a user device of a user, the interactive media application enabling communications with the media outlet device via the media outlet application;
recording and encoding video content on the user device;
displaying an interactive map on a user interface of the media outlet device, the interactive map showing a current location of the user device;
enabling purchase of the video content from the user via the user interface;
communicating the purchased video content from the user device to at least one of a central server and the media outlet device;
wherein:
multiple user devices are shown on the interactive map with at least one of corresponding recording locations and routes of travel; and
the multiple user devices comprise at least one of:
active user devices which are currently recording video content; and
inactive user devices which are not currently recording video content.

12. A method in accordance with claim 11, further comprising recording associated metadata information for storage and transmission together with the video content, the associated metadata information comprising at least one of date and time information of the recording and geographic position information indicative of a recording location of the user device during the recording.

13. A method in accordance with claim 12, further comprising:
searching the recorded video content via the user interface and the interactive map by the at least one of the date and time information and the geographic position information.

14. A method in accordance with claim 11, further comprising:
providing icons showing the current location of the user devices;
wherein the icons for the active user devices are of a first color and the icons for the inactive user devices are of a second color.

15. A method in accordance with claim 11, wherein one or more groupings of at least one of active and inactive user devices are denoted by corresponding one or more circles on the map.

16. A method in accordance with claim 15, wherein a size of the one or more circles corresponds to a number of user devices at a location denoted by the circle.

17. A method for exchange of video content, comprising:
providing a media outlet application on a media outlet device;
providing an interactive media application on a user device of a user, the interactive media application enabling communications with the media outlet device via the media outlet application;
recording and encoding video content on the user device;
displaying an interactive map on a user interface of the media outlet device, the interactive map showing a current location of the user device;
enabling purchase of the video content from the user via the user interface;
communicating the purchased video content from the user device to at least one of a central server and the media outlet device; and
enabling a chat function on the user device and the media outlet device for communication between the user and a staff member of a media outlet;
wherein the chat function enables at least one of:
negotiations for purchase of the video content;
directions and instructions from the staff member to the user regarding the current recording of the video content; and
negotiations for purchase of future recording services.

18. A method in accordance with claim 17, wherein the directions and instructions relate to at least one of a change in the image currently being recorded, a change in vantage point of recording, a change in viewing angle, a change in focus point, a change in lighting, and a change in zoom amount.

19. A method for exchange of video content, comprising:
providing a media outlet application on a media outlet device;
providing an interactive media application on a user device of a user, the interactive media application enabling communications with the media outlet device via the media outlet application;
recording and encoding video content on the user device;
displaying an interactive map on a user interface of the media outlet device, the interactive map showing a current location of the user device;
enabling purchase of the video content from the user via the user interface;
communicating the purchased video content from the user device to at least one of a central server and the media outlet device; and
enabling a chat function on the user device and the media outlet device for communication between the user and a staff member of a media outlet;
wherein text from the chat function is shown as a transparent or translucent overlay on the user device appearing over a display showing the content being recorded.

20. A method for exchange of video content, comprising:
providing a media outlet application on a media outlet device;
providing an interactive media application on a user device of a user, the interactive media application enabling communications with the media outlet device via the media outlet application;
recording and encoding video content on the user device;
displaying an interactive map on a user interface of the media outlet device, the interactive map showing a current location of the user device;
enabling purchase of the video content from the user via the user interface;
communicating the purchased video content from the user device to at least one of a central server and the media outlet device; and
enabling a chat function on the user device and the media outlet device for communication between the user and a staff member of a media outlet;
wherein the chat function enables a transparent or translucent keyboard overlay on the user device appearing over a display showing the content being recorded.

21. A method for exchange of video content, comprising:
providing a media outlet application on a media outlet device;
providing an interactive media application on a user device of a user, the interactive media application enabling communications with the media outlet device via the media outlet application;
recording and encoding video content on the user device;
displaying an interactive map on a user interface of the media outlet device, the interactive map showing a current location of the user device;
enabling purchase of the video content from the user via the user interface; and
communicating the purchased video content from the user device to at least one of a central server and the media outlet device;
wherein:
a plurality of user devices are provided with the interactive media application;
a corresponding plurality of current locations for each of the plurality of the user devices are displayed on the interactive map;
a corresponding route for each of the plurality of user devices is displayed on the interactive map; and
for each recording location along each of the routes, a waypoint indicator is displayed on the route on the interactive map.

22. A method in accordance with claim 21, wherein selecting one of the waypoint indicators enables viewing of one of a low-resolution photograph or a low-resolution video clip from the recorded content at the corresponding recording location.

23. A system for exchange of video content, comprising:
a media outlet device;
a user device of a user adapted for recording and encoding video content and for communication with the media outlet device;
an interactive map displayed on a user interface of the media outlet device, the interactive map showing at least a current location of the user device;
a transaction engine enabling purchase of the video content from the user via the user interface;
wherein:
the purchased video content is communicated from the user device to at least one of a central server and the media outlet device;
associated metadata information is recorded for storage and transmission together with the video content, the associated metadata information comprising at least one of date and time information of the recording and geographic position information indicative of a recording location of the user device during the recording; and
the recorded video content is searchable via the user interface and the interactive map by the at least one of the date and time information and the geographic position information.

* * * * *